(12) United States Patent
Dhoolam et al.

(10) Patent No.: US 10,789,267 B1
(45) Date of Patent: Sep. 29, 2020

(54) REPLICATION GROUP DATA MANAGEMENT

(71) Applicant: Amazon Technologies, Inc., Seattle, WA (US)

(72) Inventors: Surya Prakash Dhoolam, Mill Creek, WA (US); Divya Ashok Kumar Jain, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 367 days.

(21) Appl. No.: 15/712,062

(22) Filed: Sep. 21, 2017

(51) Int. Cl.
G06F 16/00 (2019.01)
G06F 16/27 (2019.01)
G06F 3/06 (2006.01)
H04L 29/08 (2006.01)

(52) U.S. Cl.
CPC ............ *G06F 16/27* (2019.01); *G06F 3/0635* (2013.01); *G06F 16/278* (2019.01); *G06F 3/067* (2013.01); *H04L 67/1095* (2013.01)

(58) Field of Classification Search
None
See application file for complete search history.

(56) References Cited

U.S. PATENT DOCUMENTS

| | | | |
|---|---|---|---|
| 5,909,540 A | 6/1999 | Carter et al. | |
| 6,374,241 B1 | 4/2002 | Lamburt et al. | |
| 6,662,219 B1 | 12/2003 | Nishanov et al. | |
| 7,039,773 B2 | 5/2006 | Hu et al. | |
| 7,461,130 B1 | 12/2008 | AbdelAziz et al. | |
| 7,636,868 B2 * | 12/2009 | Hoffman | H04L 67/1095 714/13 |
| 7,711,820 B2 | 5/2010 | Sharma et al. | |
| 7,937,482 B1 | 5/2011 | Vermeulen et al. | |
| 8,301,600 B1 | 10/2012 | Helmick et al. | |
| 8,572,031 B2 | 10/2013 | Merriman et al. | |
| 8,732,517 B1 | 5/2014 | Stefani et al. | |
| 8,843,441 B1 | 9/2014 | Rath et al. | |
| 8,856,593 B2 * | 10/2014 | Eckhardt | G06F 11/2028 709/217 |
| 8,868,514 B2 | 10/2014 | Lomet et al. | |
| 8,965,849 B1 | 2/2015 | Goo | |
| 9,047,246 B1 | 6/2015 | Rahut | |
| 9,047,331 B2 | 6/2015 | Rao et al. | |
| 9,223,843 B1 | 12/2015 | Madhavarapu et al. | |
| 9,230,000 B1 | 1/2016 | Hsieh et al. | |
| 9,317,576 B2 | 4/2016 | Merriman et al. | |

(Continued)

OTHER PUBLICATIONS

Dhoolam et al., "Node Placement for Replication Groups," U.S. Appl. No. 15/264,479, filed Sep. 13, 2016.

(Continued)

*Primary Examiner* — Debbie M Le
(74) *Attorney, Agent, or Firm* — Davis Wright Tremaine LLP

(57) ABSTRACT

Data replication groups may be used to store data in a distributed computing environment. A data replication group may include a set of nodes executing a consensus protocol. The nodes may be executed by a set of host computer systems within a distributed computing environment. In addition, the data replication group may include a number of slots used to store data. In this manner, a single data replication group may maintain a plurality of stored data objects.

20 Claims, 8 Drawing Sheets

(56) References Cited

U.S. PATENT DOCUMENTS

| | | | |
|---|---|---|---|
| 9,489,434 B1 | 11/2016 | Rath | |
| 9,529,882 B2* | 12/2016 | Vermeulen | G06F 16/27 |
| 9,552,242 B1 | 1/2017 | Leshinsky et al. | |
| 9,569,454 B2* | 2/2017 | Ebsen | G06F 16/185 |
| 9,569,513 B1 | 2/2017 | Vig et al. | |
| 9,639,589 B1 | 5/2017 | Theimer et al. | |
| 9,755,985 B1* | 9/2017 | Lutz | H04L 47/6255 |
| 9,805,108 B2 | 10/2017 | Merriman et al. | |
| 10,025,802 B2* | 7/2018 | Vermeulen | G06F 16/21 |
| 10,171,629 B2 | 1/2019 | Bute et al. | |
| 10,452,681 B1* | 10/2019 | Chen | G06F 16/27 |
| 10,489,230 B1 | 11/2019 | Chen et al. | |
| 2002/0161889 A1 | 10/2002 | Gamache et al. | |
| 2004/0263152 A1 | 12/2004 | Ahrikencheikh | |
| 2005/0005200 A1 | 1/2005 | Matena et al. | |
| 2006/0020634 A1 | 1/2006 | Huras et al. | |
| 2006/0218204 A1 | 9/2006 | Ofer et al. | |
| 2007/0156842 A1 | 7/2007 | Vermeulen et al. | |
| 2007/0299955 A1 | 12/2007 | Hoffman et al. | |
| 2009/0049240 A1 | 2/2009 | Oe et al. | |
| 2010/0274768 A1 | 10/2010 | Wang et al. | |
| 2011/0161294 A1* | 6/2011 | Vengerov | G06F 16/275 707/637 |
| 2011/0307886 A1 | 12/2011 | Thanga et al. | |
| 2012/0011398 A1 | 1/2012 | Eckhardt et al. | |
| 2012/0117229 A1 | 5/2012 | Van Biljon et al. | |
| 2012/0197868 A1 | 8/2012 | Fauser et al. | |
| 2013/0110774 A1 | 5/2013 | Shah et al. | |
| 2013/0290249 A1 | 10/2013 | Merriman et al. | |
| 2014/0032506 A1 | 1/2014 | Hoey et al. | |
| 2014/0136896 A1 | 5/2014 | Tak et al. | |
| 2014/0172944 A1 | 6/2014 | Newton et al. | |
| 2014/0337393 A1 | 11/2014 | Burchall et al. | |
| 2015/0169417 A1 | 6/2015 | Brandwine et al. | |
| 2015/0186229 A1 | 7/2015 | Bortnikov et al. | |
| 2015/0347548 A1 | 12/2015 | Mortensen et al. | |
| 2015/0372389 A1 | 12/2015 | Chen et al. | |
| 2016/0147859 A1 | 5/2016 | Lee et al. | |
| 2017/0004317 A1 | 1/2017 | Bumbulis | |
| 2017/0270176 A1 | 9/2017 | Horowitz et al. | |
| 2017/0366451 A1 | 12/2017 | Schreter | |
| 2017/0366619 A1 | 12/2017 | Schreter | |
| 2017/0371567 A1 | 12/2017 | Piduri | |
| 2018/0096066 A1* | 4/2018 | Venkataramanappa | G06F 16/2379 |

OTHER PUBLICATIONS

Abadi, "Consistency Tradeoffs in Modern Distributed Database System Design," Computer 45(2):37-42, Feb. 2012.

Bernstein, "Rethinking Eventual Consistency," Proceedings of the 2013 ACM SIGMOD International Conference on Management of Data, Jun. 22, 2013, 5 pages.

Chandy et al., "Distributed Snapshots: Determining Global States of Distributed Systems," ACM Transactions on Computer Systems 3(1):63-75, Feb. 1985.

Chen et al., "Replication Group Pools for Fast Provisioning," U.S. Appl. No. 14/954,928, filed Nov. 30, 2015.

Decandia et al., "Dynamo: Amazon's Highly Available Key-value Store," ACM SIGOPS Operating Systems Review 41(6):205-220, Oct. 14, 2007.

Dwork et al., "Consensus in the presence of partial synchrony," Journal of the Association for Computer Machinery 35(2):288-323, Apr. 1, 1988.

Gilbert et al., "Brewer's Conjecture and the Feasibility of Consistent, Available, Partition-Tolerant Web Services," ACM SIGACT News 33(2):51-59, Jun. 1, 2002.

Gray et al., "Leases: An Efficient Fault-Tolerant Mechanism for Distributed File Cache Consistency," ACM SIGOPS Operating Systems Review 23(5):202-210, Dec. 3-6, 1989.

Lamport et al., "Cheap Paxos," International Conference on InDependable Systems and Networks, Jun. 28, 2004, 9 pages.

Lamport, "Paxos Made Simple," Microsoft Research, Nov. 1, 2001, retrieved Aug. 22, 2016, from http://research.microsoft.com/en-us/um/people/lamport/pubs/paxos-simple.pdf, 14 pages.

Letia et al., "CRDTs: Consistency without concurrency control," Rapport de recherche 6956, Jun. 2009, 13 pages.

MacCormick et al., "Niobe: A Practical Replication Protocol," Microsoft Research, Aug. 2007, retrieved Aug. 22, 2016, from https://www.microsoft.com/en-us/research/wp-content/uploads/2007/08/tr-2007-112.pdf, 42 pages.

Peleg et al., "The Availability of Quorum Systems," Information and Computation 123(2):210-223, Dec. 1, 1995.

Trencseni et al., "PaxosLease: Diskless Paxos for Leases," Cornell University Library, Sep. 19, 2012, retrieved Aug. 22, 2016, from http://arxiv.org/pdf/1209.4187.pdf, 9 pages.

Wikipedia, "Ford-Fulkerson Algorithm," Aug. 9, 2016, retrieved Aug. 29, 2016, from https://en.wikipedia.org/wiki/Ford%E2%80%93Fulkerson_algorithm, 5 pages.

Wikipedia, "Maximum flow problem," Aug. 22, 2016, retrieved Aug. 29, 2016, from https://en.wikipedia.org/wiki/Maximum_flow_problem, 11 pages.

Wikipedia, "Paxos (computer science)," Jun. 5, 2017, retrieved Jun. 6, 2017, from https://en.wikipedia.org/w/index.php?title=Paxos_(computer_science)&oldid=783901344, 19 pages.

* cited by examiner

REPLICATION GROUP DATA MANAGEMENT

BACKGROUND

Organizations invest in technologies that provide customers with access to computing resources. Such services provide access to computing and/or storage resources (e.g., storage devices providing either a block-level device interface or a web service interface) to customers or subscribers. Within multi-tier ecommerce systems, combinations of different types of resources may be allocated to customers and/or their applications, such as whole physical or virtual machines, CPUs, memory, network bandwidth, or I/O capacity. Block-level storage devices implemented by a storage service may be made accessible, for example, from one or more physical or virtual machines implemented by another service.

Computer systems that provide services to customers may employ various techniques to protect the computer systems from a number of service requests that could potentially overload the computer systems. Furthermore, these computer systems may also employ various techniques to preserve customer data and customer experience during periods when the computer systems are overloaded or even experiencing failures. In general, a computer system is considered to be in an "overloaded" state if it is not able to provide the expected quality of service for at least some portion of customer requests it receives. Common solutions applied by overloaded computer systems include denying service to customers. In addition to this "overloaded" scenario, computer systems may also experience failure, including critical failure, power failure, or network failure.

To protect customer data against failures, customer data is often replicated across different computer systems. However, creating consistent replicas of customer data across a plurality of computer systems requires additional resources and requires consensus on customer data across the plurality of computer systems. Additionally, there is increased cost and time required to provision computer systems to maintain replicas of customer data. While such systems may maintain the integrity of customer data and mitigate the risk of loss, there may be a reduction in customer experience and delay in customers obtaining their data.

BRIEF DESCRIPTION OF THE DRAWINGS

Various techniques will be described with reference to the drawings, in which.

DETAILED DESCRIPTION

Figure 1:
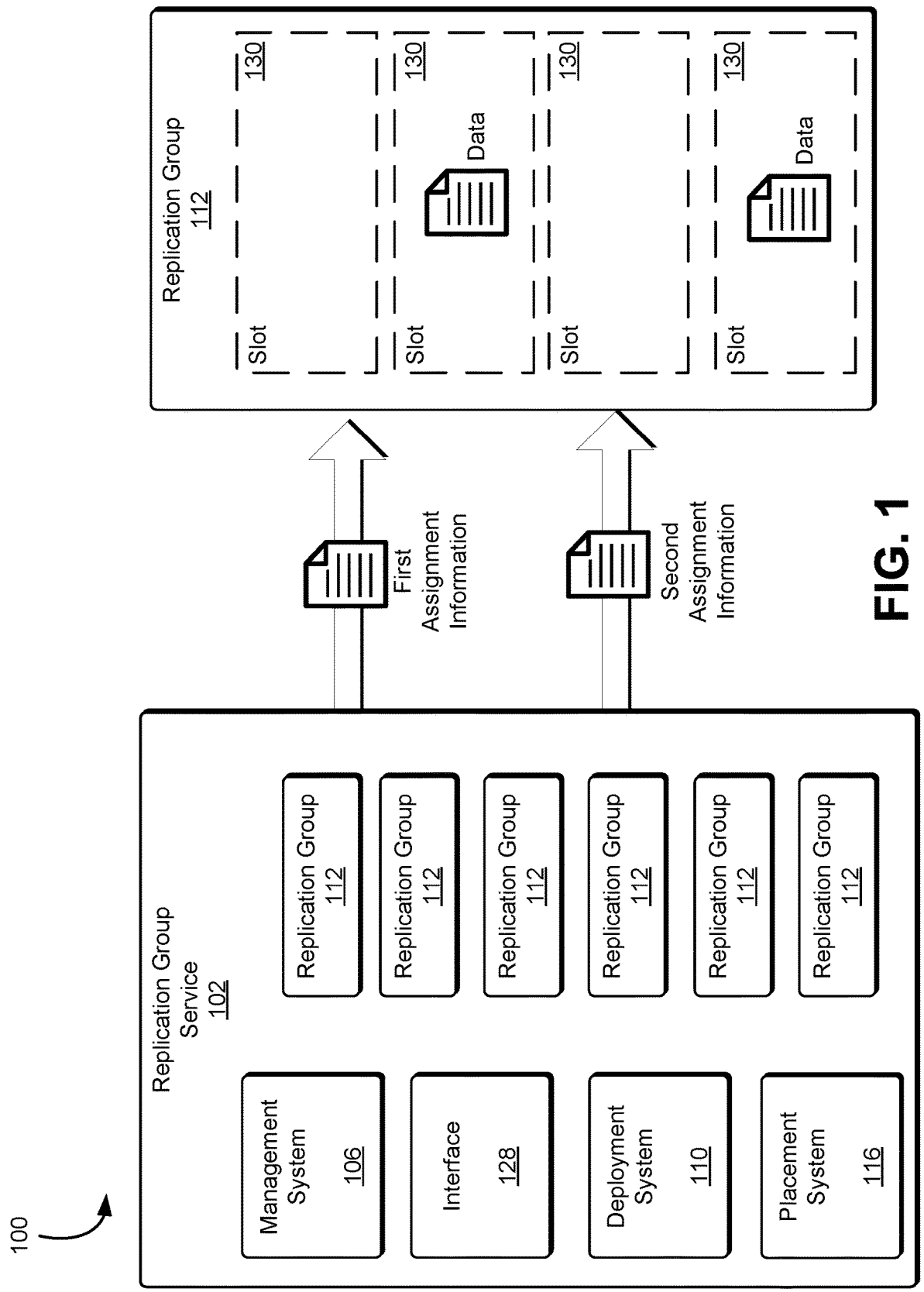
FIG. 1 illustrates an environment in which a replication group service determines placement information for data to be stored by a data replication group in accordance with an embodiment.

In various examples described below, a replication group service provides data replication groups that manage storage of a plurality of data objects. For each data object or set of information maintained by a particular data replication group, the particular data group may execute a separate instance of a consensus protocol as described in greater detail below. In yet other examples, the data replication groups execute a single instance of the consensus protocol responsible for managing all of the data assigned to various slots of the data replication group. As described in greater detail below, in such examples operations and/or proposals of the consensus protocol may be batched or otherwise combined to reduce consumption of computing resources (e.g., network bandwidth). The data replication groups may consist of a number of nodes executed by one or more host computer systems, where the nodes implement a consensus protocol, such as Paxos, to enable consistent data replication between the nodes. In one example, the data replication group is associated with a particular computer system or storage system and may maintain the current state of that system. Furthermore, as described in greater detail below, the data replication group may contain a certain number of "slots" (e.g., a logical and/or physical maximum number of data objects the data replication group can maintain) for tracking the current state of a particular computer system or storage system. For example, a particular data replication group contains eight slots for maintaining state information for eight different computer systems. As described in greater detail below, each slot may correspond to an instance of a consensus protocol being executed by the nodes of the data replication group. The data replication group then executes a separate instantiation of a consensus protocol for each slot. As described in greater detail below, the consensus protocol may be optimized or otherwise modified for multiple instantiations. In addition, the number of slots for a particular data replication group may be dynamically increased or decreased. In one example, contention for computing resource among the different instantiations of the consensus protocol causes the number of slots of the data replication group to be reduced.

In some of the examples described above, progression of the consensus protocol includes receiving and recording updates to the current state of a computer system. In another example, the data replication group is associated with a particular customer and stores customer data. In such examples, progression of the consensus protocol includes receiving and recording data on behalf of the customer. In such embodiments, the data replication group contains a number of slots to maintain data on behalf of customers. The replication group service may receive a request for a data replication group to support a particular computing resource or activity. In response, the replication group service may determine a data replication group with sufficient capacity and that satisfies one or more placement constraints to maintain the data. In some examples, if no data replication group stratifying those requirements is found, the data replication group service obtains a set of nodes from a placement service that satisfy the one or more constraints and selects a number of nodes from the set of nodes to execute the data replication group. The data replication group may contain any number of nodes. Furthermore, the nodes may be executed by host computer systems, described in greater detail below, and may be part of a plurality of data replication groups. For example, a single node has the capacity to be a member of five data replication groups.

The placement system may obtain configuration information or other information indicating the number of free slots in a data replication group, the number of data replication groups, the number of nodes, location of the data replication groups, location of nodes, capacity of node, and other information associated with the data replication groups and the nodes thereof in a computing resource service provider environment. When the placement service receives a request to assign a data object to a data replication group, the request may indicate customer identification information, existing nodes of a data replication group (e.g., if the request is a request to repair a particular data replication group), one or more constraints, one or more constraints to ignore, particular nodes to ignore (e.g., a black list of nodes), location information for the computer system to be supported by the data replication group, or other information suitable for selecting a data replication group. In response to the request, the placement system may filter out and prioritize data replication groups, nodes, host computer systems, deployment groups, or other logical or physical organization of nodes. The placement service may then execute a selection algorithm to determine the set of nodes satisfying the one or more constraints and other requirements of the data replication group. If no nodes or an insufficient number of nodes satisfy the requirement, the placement service may transmit a notification of insufficient capacity.

In the preceding and following descriptions, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which a computing resource service provider may operate a replication group service 102 configured to manage one or more data replication groups. A data replication group 112, as described in greater detail below, includes a number of nodes implementing a consensus protocol to maintain a data object, set of data objects, or other information distributed among the nodes. The nodes of the data replication group 112 may store copies or replicas of data so as to provide redundancy in the event of the loss of some number of nodes. The replication group service 102 may be configured as a clustered storage system for storing customer data, metadata about customer data, or other data across a plurality of physical hosts. Such a clustered storage configuration may reduce the risk of failure and increase availability of the data replication group 112 or particular nodes of the data replication group 112 during network connection events and/or network connection issues. For example, the number of nodes of the data replication group 112 may be selected such that the probability of a majority of the nodes of the data replication group 112 failing is below a value relative to some threshold. This may be accomplished by a placement system 116 of the replication group service 102 determining placement information for the nodes and/or the data replication group 112.

The replication group service 102 may maintain a plurality of data replication groups; in turn, each data replication group 112 may consist of a plurality of nodes. Each node may be executed by a physical host, described in greater detail below in connection with FIG. 4, and each node may participate in a plurality of data replication groups. In addition, each data replication group 112 may contain a number of slots 130. For example, as illustrated in FIG. 1, the data replication group 112 contains four slots for maintaining a data object or other information as described in the present disclosure. The data replication groups may include replicated state machines or other storage systems for each slot 130 to store data in a distributed computing environment. In addition, each node may be assigned a particular color. In some embodiments, nodes may only communicate with other nodes of the same color. Each color may be considered a logical grouping on nodes used to reduce and mitigate the effect of an operating event. For example, by assigning a customer two data replication groups of two distinct colors in the event of a failure of the nodes of one color, the other data replication group in not affected. Various other placement constraints can be used to reduce the impact on customers in the event of an operational or other failure.

In various embodiments, each node is a process, executed by a host computer system or other computer system, described in greater detail below, which participates in one or more data replication groups. In one example, a particular data replication group implements a Paxos consensus protocol (e.g., a member of the Paxos family of protocols), each node of the particular data replication group implementing one or more roles of the Paxos consensus protocol such as the role of master, acceptor, proposer, and/or learner. As described in the present disclosure, the consensus protocol may include a variety of different consensus protocols such as Cheap Paxos, Fast Paxos, Multi-Paxos, Lockstep protocol, two-phase commit protocols, proof of work protocols, peer-to-peer network protocols, or Phase King Algorithm In addition, the consensus protocol executed by the nodes may include a master node responsible for progressing the consensus protocol (e.g., transmitting proposals which may be accepted by the remaining nodes of the data replication group 112). The master node may be a role assigned to a single node of the data replication group 112 and may be responsible for managing certain aspects of the consensus protocol. In this manner, the nodes of the data replication group 112 may be responsible for the durability of customer data or other data maintained by the data replication group 112.

The consensus protocol may include a family of different protocols configured to solve consensus issues in a network of unreliable processors (e.g., computer systems and networks that are subject to possible failures). The consensus protocol ensures agreement on one result and/or one operation among a group of participants, for example, the nodes of the data replication group 112. The consensus protocol may be used by the replication group service 102 and the data replication group 112 to implement state machine replication and/or data replication in a distributed computing environment, such as the environment 100 illustrated in FIG. 1. The consensus protocol may define the set of actions which may be performed by the nodes of the data replication group 112 according to one or more predefined roles included in the consensus protocol: client, acceptor, proposer, learner, and master. In some embodiments, a single node of a particular data replication group may implement one or more roles at any given time. In one example, a particular node is a master, acceptor, and learner in accordance with the consensus protocol.

A client, which may include a computer system under the control of a customer of the computing resource service provider and/or application or other executable code executed by one or more other computer systems or services of the computing resource service provider, may issue requests to the data replication group 112 and/or replication group service 102 and wait for a response. For example, the client may include a customer transmitting a storage request to an interface 128 of the replication group service 102. The interface 128 may include a web-services front end or other computer system interface configured to receive an application program interface (API) request and process the API request and/or direct the API request to an appropriate computer system or service for processing. In another example, the client may include another service of the computing resource service provider issuing a request to store state information of the other service on behalf of a customer. The interface 128 may also accept requests for other components of the replication group service 102, such as the management system 106, the placement system 116, or a deployment system 110. For example, the interface 128 may receive a request and/or command to update software executed by the nodes or host computer server executing the nodes and direct the request to the deployment system 110 described in greater detail below. In another example, the interface 128 may receive a request for leadership and/or placement information, described in greater detail below, from one or more nodes of the replication group.

Returning to the example above, in accordance with the consensus protocol, acceptors implemented by one or more nodes of the data replication group 112 may be collected or assembled into groups, collectively referred to as quorums. In various embodiments, a quorum includes a majority of the nodes of the data replication group 112. In various embodiments of the consensus protocol, any message sent to an acceptor must be sent to the quorum of acceptors, and any message received from an acceptor is ignored unless a copy is received from each acceptor in the quorum. A proposer, when implemented by a node of the data replication group 112, may transmit proposals to acceptors. A proposal may include a message attempting to reach an agreement on a value and/or action by the acceptors. As described in greater detail in connection with FIGS. 5 and 6, in various embodiments, proposals that do not violate one or more compatibility rules are combined to reduce contention and consumption of computing resources by the data replication group 112. A learner, when implemented by a node of the data replication group 112, may perform some action once an agreement is reached (e.g., transmit a response to the client). As described in greater detail below, contention includes any consumption of computing resources of a host computer system implementing one or more nodes of a data replication group that may conflict with or otherwise take away from the computing resource available of other nodes implemented by the host. In one example, contention may create network latency between two or more nodes. In another example, contention may reduce a number of processor cycles available to one or more nodes. Finally, a master, when implemented by a node of the data replication group 112, may perform actions to advance the nodes of the data replication group 112. In one example, the master executes a heartbeat message to ensure that the consensus protocol is being successfully implemented by the nodes of the data replication group 112.

In general, any protocol that satisfies the consensus requirements of the replication group service 102 and data replication groups 112 may be implemented in accordance with the embodiments described herein. Other examples of consensus protocols include Lockstep protocol, two-phase commit protocols, proof of work protocols, peer-to-peer network protocols, or Phase King Algorithm. Furthermore, in some embodiments, additional constraints may be placed on the consensus protocol implemented by the replication group service 102 and data replication groups as required. For example, the replication group service 102 and data replication groups may require the implemented consensus protocol to allow for the addition of a new member and/or node to the data replication group 112 at some point in time after the initialization of the data replication group 112.

Additionally, the number of nodes in the data replication group 112 may vary depending on the latency and durability requirements of the customer, other services of the computer system, or replication group service 102. In one example, the number of nodes in the data replication group 112 is reduced if a particular service and/or customer requires reduced latency and response time. In contrast, if a customer and/or service requires higher fault tolerance and data durability, the number of nodes in the data replication group 112 may be increased. A management system 106 of the replication group service 102 may be responsible for determining the number of nodes in a particular data replication group. The management system 106 may be a process or other application executed by a host computer system.

Similarly, the number of slots 130 of the data replication group 112 may vary depending on latency, consumption of computing resources, contention for computing resources, and durability requirements of the customer, other services of the computer system, or replication group service 102. In one example, a particular data replication group contains six slots 130, three of which are maintaining data, in a situation where the three active slots 130 are exchanging a number of messages so as to consume all of the computing resources of nodes of the data replication group 112. In response, the management system 106 reduces the number of slots 130 of the particular data replication group from six to three. In addition, in such examples, the management system 106 may even move a slot 130 to another data replication group. Moving the slot 130 may include copying the data to another data replication group.

Furthermore, the management system 106 may be responsible for creation, termination, and assignment of the data replication groups 112. For example, the management system 106 may determine that a new data replication group is to be created and may communicate with one or more other services (not shown in FIG. 1 for simplicity) of the computing resource service provider in order to create the new data replication group. The process of creating new data replication groups is described in greater detail below. The management system 106 may also be responsible for assigning and/or associating a particular data replication group to a customer and/or assigning a particular slot 130 to a customer and/or data to be maintained. For example, the management system 106 may map a particular data replication group or address of the particular data replication group to a customer such that the particular data replication group may receive traffic from or on behalf of the customer.

In another example, the management system 106 may determine a number of host computer systems to execute nodes of the data replication group 112 based at least in part on a set of nodes provided by the placement system 116 in accordance with one or more constraints on node placement. As described in greater detail below, the placement system 116 may also provide information indicating a slot 130 of a data replication group 112 to the management system 106.

The placement system 116 may be a process or application executed by a host computer system. In addition, the placement system 116 may monitor and determine the placement of nodes, slots 130, and data replication groups 112 in a distributed computing environment as described in greater detail below. In one example, the placement system 116 attempts to determine a set of host computer systems to implement the nodes of a data replication group 112 such that a fault or error of a particular computing resource (e.g., router, server, power source, or top of rack switch) does not prevent a quorum of nodes from communicating. In another example, the placement system 116 attempts to determine an existing data replication group 112 that contains at least one unassigned slot 130 and does not violate one or more placement constraints. In addition, the placement system 116 may attempt to place nodes or slots 130 within a certain distance or locality of the computer systems supported by the data replication group 112. In an example, it is advantageous to place the nodes of the data replication group 112 on the same server or rack as a particular logical volume supported by the data replication group 112.

In various examples, a computing resource service provider provides customers access to logical volumes through a data storage service. The logical volumes may store customer data and the data replication group 112 may store metadata associated with that logical volume, such as size, when the logical volume was created, or a master partition and slave partition associated with the logical volume, etc. In these examples, each slot 130 may store this information for a single logical volume. When new volumes are created, the placement system 116 may determine the data replication group 112 contains sufficient capacity (e.g., an appropriate number of open slots 130) to maintain the metadata associated with the volume and provide the determination to the management system 106. The management system 106 may then transmit assignment information to the data replication group 112 as illustrated in FIG. 1. In various embodiments, the data of a logical volume can be spread out among multiple physical volumes. In addition, the volume may have a network address of a storage server, however; the storage server may map the logical blocks of the volume to logical blocks of the underlying physical devices (e.g., disk drives of a server as described in greater detail below in connection with FIG. 4) which can be spread out over a network (or on the same server).

The placement system 116 may monitor and store information indicating the location of various computing resources, nodes (e.g., particular computing resources implementing the nodes), and slots 130 in the distributed computing environment. This information may enable the placement system 116 to determine assignment information for the slots 130 of the data replication groups 112. The assignment information may indicate a slot 130, a set of nodes, and/or the location of nodes that satisfy various placement constraints. The one or more constraints may include: the placement system 116 returning a free slot 130, the data replication group 112 containing the free slot 130 satisfying at least one constraint, the placement system 116 returning a certain number of nodes (e.g., a request for the placement system 116 to return a set of nodes must include at least seven nodes), all nodes in the set must belong to the same color, any one deployment group may not contain more than a certain number of nodes, a particular rack or other physical computing resource may not contain more than a certain number of nodes, all nodes must be spread across a certain number of deployment groups, nodes without sufficient capacity must not be included in the set of nodes, or any other constraint that may be required to ensure robustness, consistency, and progress of the nodes of the data replication group 112. In addition to the one or more constraints, the placement system 116 may attempt to satisfy one or more soft constraints on the set of nodes. The one or more soft containers may include: the data replication group 112 should be local with the computing resource supported (e.g., all the nodes should be in the same brick, network, or data center as a particular logical volume supported by the data replication group), the color of the nodes should be diverse for the customer associated with the data replication group 112, the placement system 116 should balance node capacity (e.g., using a round-robin or other selection algorithm for assigning nodes to data replication groups), nodes should be spread across deployment groups, should be concentrated within a locality or, if space is not available for all the nodes in a single locality nodes outside the locality, should be concentrated, and any other constraint that may be required to ensure robustness, consistency, and progress on the nodes of the data replication group 112.

In addition, creation of the data replication groups 112, nodes, slots 130, and logical volumes supported by data replication group 112 may occur at different intervals of time. For example, the nodes may be executed on physical hosts prior to assignment and/or inclusion in a particular data replication group. In such embodiments, the placement system 116 may be provided with a placement hint or other information indicating a potential or probable location of a computing resource (e.g., logical volume) a particular data replication group is to support. For example, a virtual machine service may indicate a locality (e.g., a particular server or rack) which will support a new virtual machine to be supported by a particular data replication group. In another example, a block-level storage service may provide the placement system 116 with a placement hint indicating the physical location of a storage device which will likely host a new logical volume. The placement system 116 may utilize the placement hint as an input to the selection algorithm to include nodes that satisfy one or more constraints given the location indicated in the placement hint (e.g., a certain number of nodes with the same locality as indicated in the placement hint).

Based at least in part on the various constraints and soft constraints, the placement system 116 may generate assignment information that may cause a slot 130 of the data replication group 112 to be assigned to a particular data object (e.g., metadata for a particular logical volume). In this manner, the failure of a computing resource outside the host computer system may not prevent the data replication group 112 from operating. Furthermore, if the majority of the nodes or the master node is unavailable, then the data replication group 112 is not able to operate properly, and progress of the consensus protocol cannot be made. Progress may include updating and/or storing additional information in the nodes. For example, the nodes may store information indicating the location of volume partitions such as partitions in a master-slave volume pair. In such an example, progress of the consensus protocol requires that the nodes may update and/or record modifications to the master-slave volume pair (e.g., movement of a volume from a first host computer system to a second host computer system).

In addition to the constraints, the placement system 116 may use one or more selection algorithms described in greater detail below to select a particular slot 130. For example, the placement system 116 may use a backtracking search to search all available nodes which may be included in the data replication group 112 containing the slot 130. In various embodiments, the placement system 116 utilizes one or more modified maximum network flow algorithms to determine the set of nodes, data replication group 112, and/or slot 130. Specifically, the placement system 116 may generate a graph or similar representation of the configuration of nodes, host computer systems, and other computing resources in the computing resource service provider environment and use various algorithms to traverse the graph and determine a solution.

The deployment system 110 may be a process or other application executed by a host computer system. Furthermore, the deployment system 110 may be responsible for maintaining a plurality of deployment groups and distributing deployments to one or more host computer systems executing one or more nodes of the data replication group 112. The nodes of the data replication group 112 may be distributed across a plurality of host computer systems such that no one host computer system executes a quorum of the nodes of a particular data replication group. Deployments may include any software deployment or other distribution of executable code configured to install and/or update software of a host computer system or other computer systems capable of executing the source code associated with the software. Software deployment may include all of the activities that make a software system available for use. The general deployment process may consist of several interrelated activities with possible transitions between them. These activities can occur at the software developer side, client side, or both. Various different deployments and deployment activities may be utilized in accordance with the present disclosure. The deployment system 110 may manage various deployment activities such as preparing a deployment for release to the host computer systems, installing and activating the executable content included in the deployment, version tracking, updating, uninstalling, and various other activities suitable for deploying software to hosts.

In various embodiments, the host computer systems may be initialized and configured to execute a certain number of nodes of one or more data replication groups. These host computer systems may be available and idle until the replication group service 102 determines to utilize the resources of the host computer system. For example, when the replication group service 102 receives a request for a data replication group, the replication group service 102 or component thereof, such as the management system 106, may select host computer systems to implement nodes of the data replication group 112 based at least in part on an evenness criteria described in greater detail below.

Figure 2:
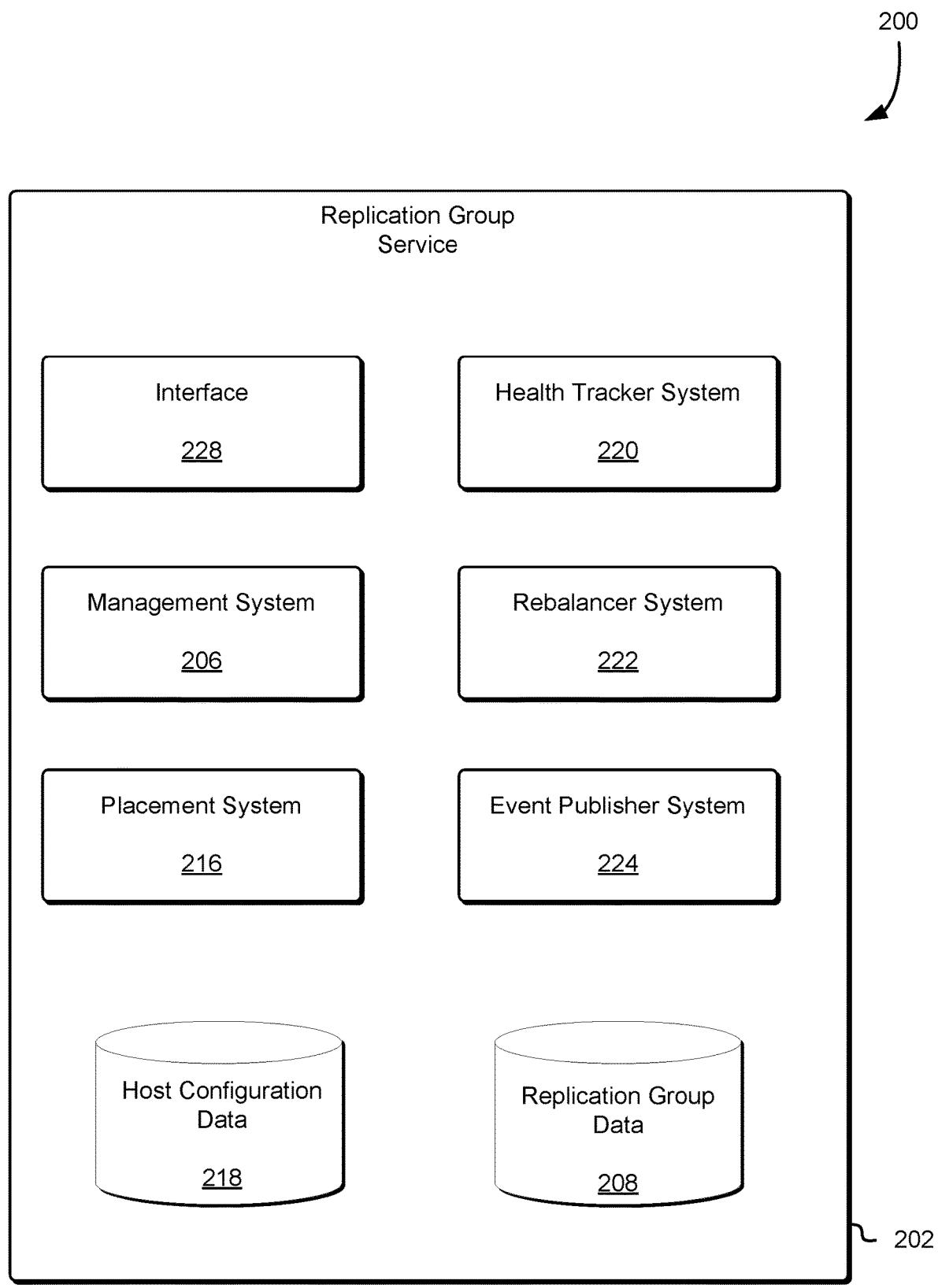
FIG. 2 illustrates an environment in which a replication group service maintains data replication groups in accordance with an embodiment.

FIG. 2 illustrates an environment 200 in which a computing resource service provider may operate a replication group service 202 that manages one or more data replication groups in accordance with at least one embodiment. The data replication group service 202, as illustrated in FIG. 2, contains several components described in greater detail below, including an interface 228, a management system 206, a placement system 216, a health tracker system 220, a rebalancer system 222, an event publisher system 224, host configuration data 218, and replication group data 208. In some embodiments, provisioning a data replication group or a particular slot of the data replication group, such that it may implement a consensus protocol and begin to receive traffic, may increase latency or violate the terms of a service-level agreement (SLA). An SLA may be part of a service contract or other agreement between a computing resource service provider and a customer where a particular service is formally defined. Therefore, as described in greater detail below, the replication group service 202 may cause data replication groups to create a number of slots during creation of the data replication group.

In various embodiments, the replication group service 202 may just include the interface 228, the management system 206, and the placement system 216 with the operations of the additional component illustrated in FIG. 2 performed by the management system 206 and/or placement system 216. In addition, the replication group service 202 may maintain replication group data 208 and host configuration data 218. In various embodiments, the data replication groups are distributed across regions, geographic boundaries, physical boundaries, fault zones, power zones, or other logical groupings of computing resources in a distributed computing environment. As described above, a number of nodes of the data replication group that are members of different data replication groups may be limited by the placement system 216.

The replication group service 202 may further include replication group data 208. Replication group data 208 may consist of data corresponding to the data replication groups, nodes of the data replication groups, slots of the data replication groups, data objects associated with slots of the data replication groups, assignment of slots to customers or services, customers or services mapped to particular data replication groups, and any such other data as required by the management system 206 and/or other component of the replication group service 202. The replication group data 208 may be maintained in a database of other data stores such that the data is accessible and/or queryable by other components of the replication group service 202, customer, or other services. In one example, replication group data 208 is data to aid in discovery of nodes by one or more other nodes of the data replication groups. In another example, the replication group data 208 includes a mapping of logical volumes to slots of data replication groups. This data may include a mapping of data replication groups to nodes as well. Furthermore, the data may include information about particular nodes and/or roles of the particular nodes. For example, an input/output (I/O) request may be received at the interface 228 of the replication group service 202. The I/O request may indicate a particular data replication group, the replication group service 202 or component thereof, and may query the replication group data 208 in order to determine a leader or other node of the data replication group designated to receive the I/O request.

In various embodiments, the placement system 216 uses the replication group data 208 to help determine placement information, such as the location of nodes or the data replication groups and the nodes' membership to one or more data replication groups, as well as free slots within a data replication group and/or capacity of the data replication group to generate additional slots. The data in the replication group data 208 may be updated at various intervals of time or based at least in part on one or more triggering events (including the expiration of an interval of time). In one example, the event publisher system 224 queries the nodes and/or data replication groups to obtain information useable to update the replication group data 208. The replication group data 208 may also include information corresponding to the number of data replication groups, a number of nodes of a particular data replication group, a maximum number of data replication groups, a number of slots of the data replication groups, a maximum number of slots of the data replication groups, a frequency or number of proposals generated by a particular data replication and/or particular slot of a data replication group, and a frequency or number of requests for data replication groups received by the replication group service 202.

The replication group service 202 or component thereof may utilize this information to determine a rate at which data replication groups and/or slots of data replication groups are to be added. The process for adding data replication groups may include identifying, by the placement system 216, a set of physical hosts suitable for hosting a new data replication group, initializing nodes on the set of physical hosts to be included in the new data replication group, initializing a consensus protocol among the nodes, validating the health of the data replication group (e.g., determining the status of heartbeat messages), and updating the replication group data 208 to indicate that the new data replication group is ready to receive traffic and is a member of the deployment group. A data replication group may be considered healthy if a majority of the nodes of the data replication group are operating as expected (e.g., have successfully validated the health of the node). In addition, as described above, the placement system 216 may also execute a process to add new slots to data replication groups. The process may include determining a set of data replication groups with sufficient capacity to host the new slots that satisfy the placement constraints, requesting the data replication groups generate new slots, and updating the replication group data 208 based at least in part on a response to the requests.

The replication group service 202 may further include host configuration data 218. The host configuration data 218 may consist of information indicating the location of various computing resources in a distributed computing environment, network topology, power topology, and any such other data as required by the placement system 216 and/or replication group service 202 to be used by the placement system to determine a set of nodes to include in the data replication groups or a set of data replication groups that can support the execution of a new slot. The host configuration data 218 may be maintained in a database of other data stores such that the data is accessible and/or queryable by other components of the replication group service 202, customer or other services. In one example, the host configuration data 218 is maintained to enable the placement system 216 to determine suitable placement locations for nodes of the data replication groups based at least in part on one or more constraints. In another example, the host configuration data 218 enables the placement system 216 to determine if a particular data replication group satisfies one or more placement constraints on a new slot.

In various embodiments, when providing the data replication group in response to a request for a new slot, the data replication group may be selected based at least in part on a variety of factors, such as the health of the data replication group, the time at which the data replication group was created, a position of the data replication group in a queue, attributes of the data replication group (e.g., number of nodes, physical hosts implementing the nodes, location, latency, processing power, failure rate, fitness of a master node, etc.), a consensus protocol executed by the data replication group, and other factors that are suitable for selecting a particular data replication group to fulfill the request. The selected data replication group may then be associated with the new resource, customer, or other service responsible for submitting the request. At this point, the data replication group may generate a new slot and be ready to receive requests and store data.

As described above, the event publisher system 224 may obtain information from the data replication groups, nodes thereof, and/or host computer systems executing the nodes. The event publisher system 224 may be a process or other application executed by a host computer system. In addition, the event publisher system 224, in various embodiments, can segregate updates to information maintained by a particular data replication group to a particular slot associated with the update. The health tracker system 220, in various embodiments, obtains information indicating the health of various nodes and/or data replication groups. The health information may include a variety of information such as number of active nodes in a data replication group, response time between nodes, network latency between nodes, contention between slots, or any other information indicating the health of a node and/or data replication group. As described above, this information may be obtained by the health tracker system 220 and maintained in the replication group data 208. The health tracker system 220 may be a process or other application executed by a host computer system.

The rebalancer system 222 may be a process or other application executed by a host computer system. In addition, the rebalancer system 222, in various embodiments, is responsible for moving data objects or other information maintained by a particular slot of a data replication group to a new slot and/or new data replication group. In one example, a computing resource associated with a slot of a data replication group is moved to another host computer system and thereby causes one or more placement constraints on the data replication group to be violated. As a result, the rebalancer system 222 moves the data associated with the computing resource to a new slot of within a data replication group that does not violate the one or more placement constraints. In such examples, the rebalancer system 222 may query the placement system 216 to obtain a set of data replication group that are suitable hosts for the data object. In another example, the rebalancer system 222 is responsible for moving data object among various slots to balance the activity of the data replication groups. As described above, certain data objects may have more frequent updates than other data objects and as a result may cause increase contention and/or traffic between the nodes of the data replication group. To avoid latency and other issues caused by this contention, the rebalancer system 222 may move slots to balance the amount of traffic generated by the nodes of the data replication groups. Furthermore, the rebalancer system 222 may also delete and/or terminate unnecessary or unhealthy data replication groups.

Figure 3:
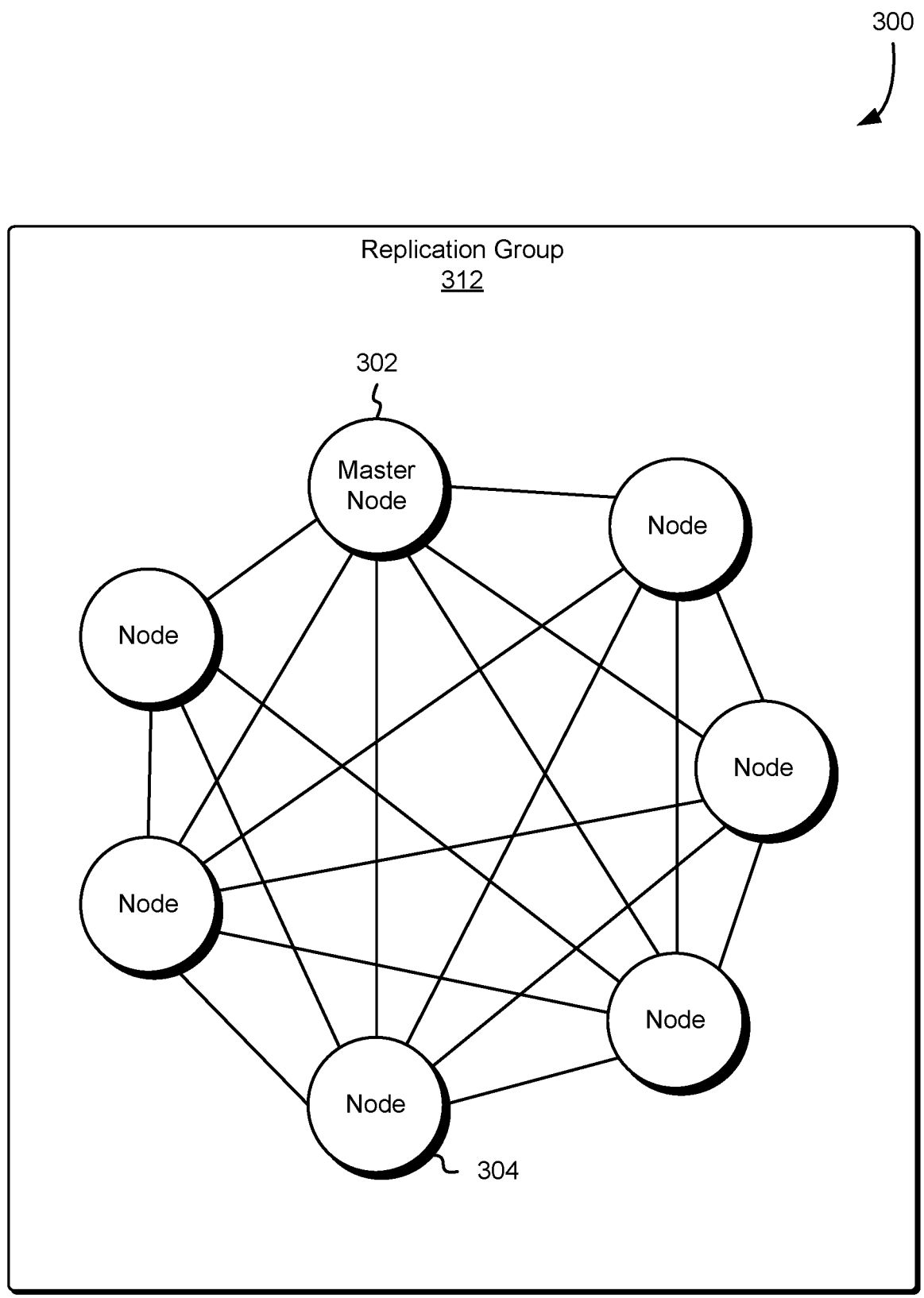
FIG. 3 illustrates configuration properties of a replication group, including replication group nodes, which may be used for implementing various types of consensus, in accordance with an embodiment.

FIG. 3 illustrates an environment 300 in which a data replication group 312 may implement a consensus protocol between one or more nodes 304 in accordance with at least one embodiment. In addition, at least one node 304 of the data replication group 312 may be a master node 302. Each node 304, including the master node 302, may be software or other executable code maintained in the memory of a physical host or other server computer system and executed by the physical host or other server computer system in order to provide the functionality described herein. Furthermore, the nodes 304 and master node 302 may be executed by one or more distinct physical hosts or other server computer systems. For example, two nodes 304 of the data replication group 312 may be executed by a first physical host and the remaining nodes 304, including the master node 302, of the data replication group 312 may be executed by a second physical host. The physical hosts are described in greater detail below.

The nodes 304 and master node 302 of the data replication group 312 may be connected (illustrated as a line between the nodes in FIG. 3) through various network connections. The network connection may be provided by various network devices, physical hosts, and other computer systems. For example, the physical hosts executing the nodes may include at least a virtualization layer and a network interface to enable the nodes to send and receive network traffic. Furthermore, the nodes 304 and master node 302 may be distributed across physical hosts and networks such that failure of one or more networks or physical hosts does not cause all of the nodes 304 of the data replication group 312 to fail. Although six nodes 304 and one master node 302 are illustrated in FIG. 3, any number of nodes 304 and master nodes 302 may be included in the data replication group 312 and distributed across a plurality of distributed computer systems in accordance with the present disclosure. However, in some embodiments, only a single master node 302 is included in the data replication group 312. This restriction may be required by the consensus protocol implemented by the data replication group 312 or may be a restriction enforced in order to increase efficiency and/or optimize execution of the data replication group 312. The master node 302 may be selected and/or determined from the set of nodes 304 in the data replication group 312. For example, the data replication group 312 may be initialized with seven nodes 304 and a master node 302 may be selected from the set of seven nodes 304.

The data replication group 312 may further include software or other executable code configured to manage the operation of the data replication group 312, nodes 304, and/or master node 302. Managing the operation of the data replication group 312 may include creating new nodes 304, replacing failed nodes 304, providing discovery of nodes 304, backing up data maintained by the nodes 304, determining roles of the consensus protocol to be performed by the nodes 304, selecting a master node 302, and other such operations as required to ensure the functioning of the data replication group 312. In various embodiments, the master node 302 executes the leader role, as described above, of the consensus protocol. Furthermore, the master node 302 may ensure progress towards eventually consistent data storage and reads from the various nodes 304 and/or slots of the data replication groups 312. The data replication group 312, illustrated in FIG. 3, may be used in connection with various embodiments described herein. Additionally, the data replication group 312 may be initialized with a certain number of nodes 304 and/or slots which may be increased over an interval of time until a desired number of nodes 304 and/or slots are reached.

Figure 4:
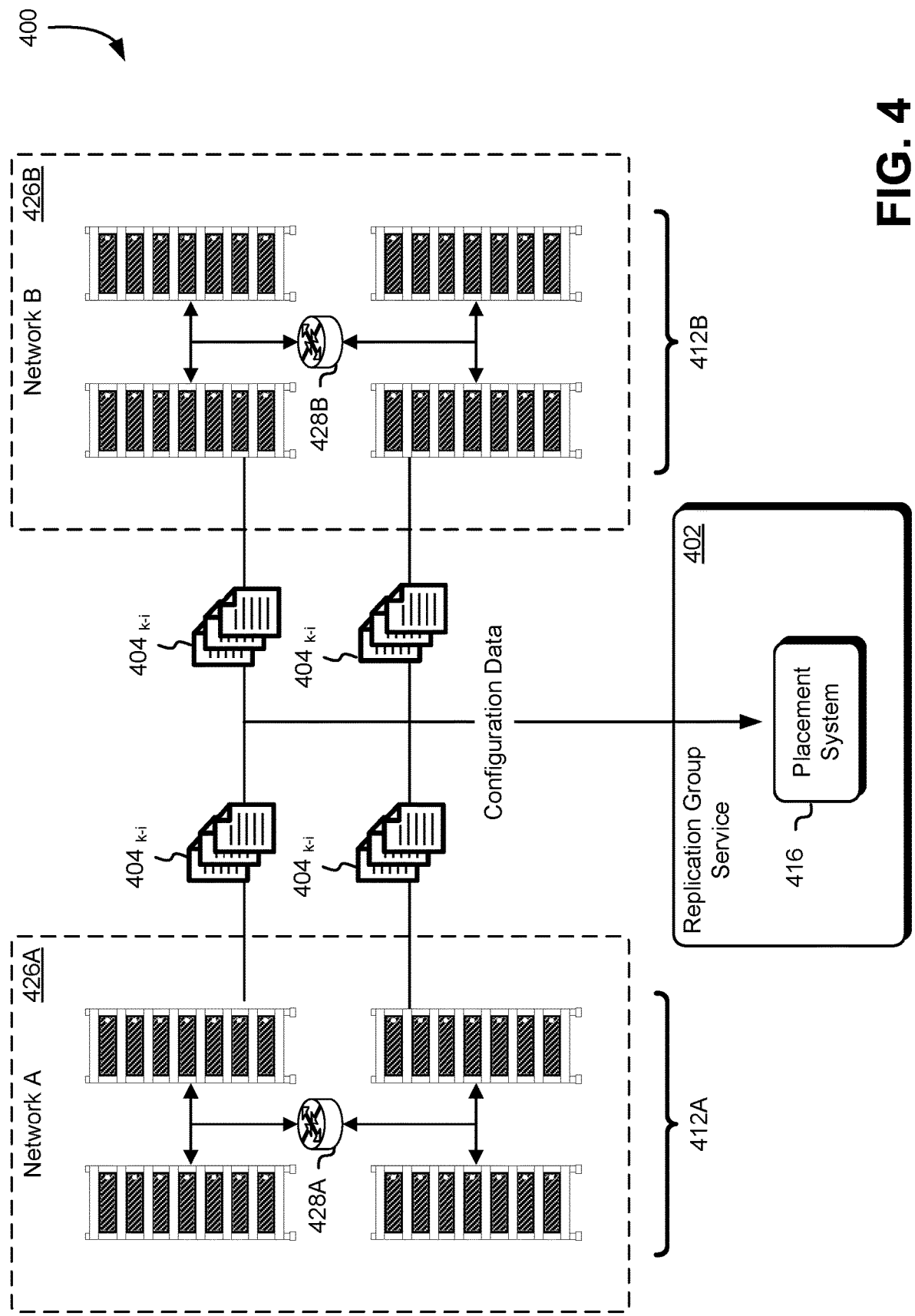
FIG. 4 illustrates an environment in which a placement system may obtain host configuration information for a set of data replication groups in accordance with an embodiment.

FIG. 4 illustrates an aspect of an environment 400 in which an embodiment may be practiced. Specifically, FIG. 4 depicts the collection and processing of host configuration data 404 by a placement system 416 to enable the placement system 416 to generate a set of data replication groups implemented by a set of nodes executed by the servers in sets of racks 412A-412B that may support a new slot. The environment 400 includes the placement system 416 of a replication group service 402 that receives host configuration data 404 from servers or other components of the sets of racks 412A-412B. The slots may be implemented by the data replication groups on the servers according to a rack diversity constraint, hard constraints, soft constraints, and other constraints, where the sets of racks 412A-412B may be localized by different networks 426A-426B. The data collected by the placement system 416 may include various elements of the host configuration data $404_{k-i}$, obtained from different servers in the sets of racks 412A-412B. For example, the data collected by the placement system 416 may include the location of various master-slave partition pairs or the number of nodes executed by a particular server in the sets of racks 412A-412B.

The placement system 416 may be software or executable code executed by the servers in the sets of racks 412A-412B or other computing resources to obtain host configuration data $404_{k-i}$, generated by the servers in the sets of racks 412A-412B implementing nodes of the data replication groups as described above in conjunction with FIG. 1. The sets of racks 412A-412B may be physical hardware that hosts one or more servers or, in some embodiments, is simply a logical grouping of the one or more servers. Examples of logical groupings other than by rack may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on. The servers in a rack may be members of a particular network. In some implementations, multiple racks of servers may be members of the same network. For example, as illustrated in FIG. 4, the servers of the set of racks 412A share the network 426A. Likewise, the servers of the set of racks 412B share the network 426B.

The networks 426A-426B may be data communication pathways between one or more electronic devices. The networks 426A-426B may be wired or wireless networks and may use any of a variety of communications protocols for organizing their network traffic. The networks 426A-426B may allow the sharing of files, data, and other types of information between the one or more electronic devices accessible through the data communication pathways. Each of the networks 426A-426B may be associated with a router, such as an aggregation router that aggregates the servers of the respective set of racks into the common network, separate from the router associated with the other network. Each of the networks 426A-426B may be on a different subnet than the other network. For example, as illustrated in FIG. 4, the servers of the set of racks 412A may be commonly connected to a router 428A. Similarly, the servers of the set of racks 412B may be commonly connected to a router 428B. The routers 428A-428B may be networking devices that forward packets between computer networks, such as between the networks 426A-426B.

As described above, the placement system 416 may obtain host configuration data $404_{k-i}$, and store the host configuration data $404_{k-i}$, for use in providing a management system of the data replication group service 402 a set of data replication groups that may support one or more slots. The placement system 416 may obtain the host configuration data $404_{k-i}$, directly from the servers and computing resources located in the environment 400 or may obtain the host configuration data $404_{k-i}$, computer systems and services responsible for managing the servers and computing resources located in the environment 400. For example, a placement service of a block-level storage service may place partitions of customer volumes on various services of the set of racks 412A-412B, and the placement system 416 may query the placement service of the block-level storage service to obtain host configuration data $404_{k-i}$, corresponding to the location of customer volumes.

Furthermore, the placement system 416 may also include a data warehouse or data storage system that stores the host configuration data $404_{k-i}$, such that the host configuration data $404_{k-i}$, may be queried. In this manner, the placement system may be able to query the host configuration data $404_{k-i}$, for information as well as being provided information corresponding to the host configuration data $404_{k-i}$ through a data stream or other mechanism for providing the data to the placement system 416. The placement system 416 may include logic, such as software or other executable code, configured to determine, based at least in part on the host configuration data $404_{k-i}$, the placement of nodes and/or slots of a data replication group that satisfies various soft constraints on locality. The soft constraints may include a set of rules that the placement system 416 will attempt to satisfy but will not provide an error if not satisfied. In addition, the locality of nodes may be determined relative to various different factors as described herein. For example, locality may be determined by network locality such as number of network hops between computing resources or being within the same network or subnetwork. In another example, locality may be determined by computing resources such as with the same rack of the set of racks 412A-412B or the same server.

The placement system 416 may attempt to achieve locality and diversity by at least generating the leadership and/or fitness information such that the number of soft constraints satisfied is maximized. For example, a first soft constraint may indicate that the master node should be executed within the same rack as a quorum of the nodes of a data replication group, and a second soft constraint may indicate that a first portion of the nodes should be executed on a network distinct from a second portion of the nodes. The placement system 416 may use a fitness function or fitness approximation to determine a value for a set of possible nodes and data replication groups based at least in part on the first and second soft constraint.

Figure 5:
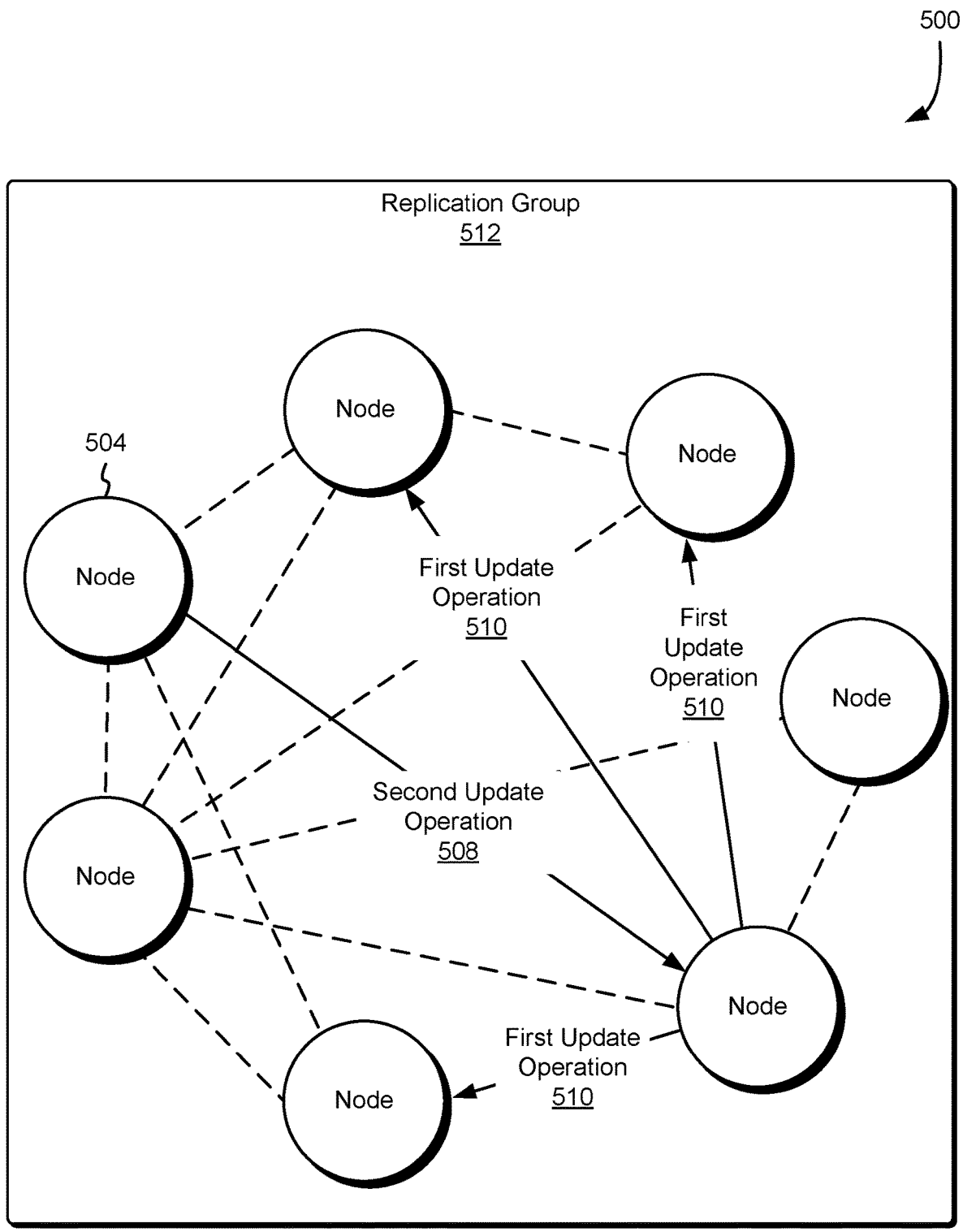
FIG. 5 illustrates configuration properties of a replication group, including replication group nodes, which may be used for implementing various types of consensus, in accordance with an embodiment.

FIG. 5 illustrates an environment 500 in which a data replication group 512 may implement a consensus protocol between one or more nodes 504 in accordance with at least one embodiment. Each node 504 may be software or other executable code maintained in the memory of a physical host or other server computer system and executed by the physical host or other server computer system in order to provide the functionality described herein. Furthermore, the nodes 504 may be executed by one or more distinct physical hosts or other server computer systems as described above. For example, two nodes 504 of the data replication group 512 may be executed by a first physical host and the remaining nodes 504 of the data replication group 512 may be executed by a second physical host. The physical hosts are described in greater detail above in connection with FIG. 4.

In various embodiments, the nodes 504 of the data replication group 512 are connected (illustrated as a dashed line between the nodes in FIG. 5) through various network connections. The network connection may be provided by various network devices, physical hosts, and other computer systems as described above in connection with FIG. 3. Furthermore, the nodes 504 may be distributed across physical hosts and networks such that failure of one or more networks or physical hosts does not cause all of the nodes 504 of the data replication group 512 to fail as described above. Although seven nodes 504 are illustrated in FIG. 5, any number of nodes 504, including a master node, may be included in the data replication group 512 and distributed across a plurality of distributed computer systems in accordance with the present disclosure.

The data replication group 512 may further include software or other executable code configured to manage the operation of the data replication group 512, nodes 504, and/or master node 302 as described above in FIG. 3. The data replication group 512, illustrated in FIG. 5, may be used in connection with various embodiments described herein. Additionally, the data replication group 512 may be initialized with a certain number of nodes 504 and/or slots which may be increased over an interval of time until a desired number of nodes 504 and/or slots are reached.

As described above, the data replication group 512 may contain a plurality of slots for storing data objects or other information. In one example, the data replication group 512 stored metadata associated with a plurality of logical volumes of a data storage service. In various embodiments, each slot and corresponding data object are associated with a unique key relative to the data replication group 512. In this manner, the nodes 504 of the data replication group 512 can advance the consensus protocol without collisions between two data objects with the same key and/or identifier. For example, as illustrated in FIG. 5, the nodes 504 of the data replication group may transmit a first update operation 510 and a second update operation 508.

In various embodiments, the first update operation 510 and the second update operation 508 include proposals of the consensus protocol to update a value of the data object maintained by the data replication group 512. In one example, the first update operation 510 is an update to a first data object and the second update operation 508 is an update to a second data object. As described above, each data object may be associated with an identifier which is included in the update operation to identify the data object to be updated. In another example, the first update operation 510 and the second update operation 508 are updates to the same data object. Furthermore, in various embodiments, update operations and/or other proposal of the consensus protocol are grouped together or otherwise batched into a single operation to reduce network consumption and other computing resource consumption.

In various embodiments, the nodes 504 batch operations and/or proposals together if the operations and/or proposals are obtained within an interval of time and comply with a set of compatibility requirements. In one example, the nodes 504 include a queue and delay operations by at least placing operations in the queue (e.g., enqueuing operations in the queue) for an interval of time (e.g., 20 milliseconds). Any operations and/or proposals contained in the queue, before the expiration of the interval of time, may be grouped together if the set of compatibility requirements are satisfied. In yet other embodiments, the queue is maintained for the data replication group 512 that contains all the outstanding operations and/or proposals for the data replication group 512.

In such embodiments, the outstanding operations and/or proposals for the data replication group 512 are delayed for an interval of time. Alternatively, the outstanding operations and/or proposals may be queued until a maximum queue depth is reached. Finally, in some embodiments, an interval of time and a maximum queue depth are used in combination where either the expiration of time or reaching the maximum queue depth causes the data replication group 512 to determine if the outstanding operations and/or proposals can be grouped together and transmit the outstanding operations and/or proposals to the nodes 504.

Various combinations of compatibility requirements may be used in accordance with the present disclosure. One example of a compatibility requirement includes: for keys included as conditions of two or more outstanding operations and/or proposals, the conditions associated with the keys must be the same. In this manner, operations and/or proposals with inconsistent conditions may be prevented from being grouped together. Another example of a compatibility rule includes: if a key is contained in an update operation of a first proposal, then the key should not be included as a condition in a second proposal. This compatibility requirement may prevent a data object from being updated and/or modified when a second proposal is condition on the data object containing a particular value.

As yet another example of a compatibility rule: for keys in two or more proposals associated with updates to the values in the two or more proposals, the values of the update must be the same. Therefore, if a particular key is contained in two or more outstanding operations and/or proposals in the queue, the proposal will be combined (at the expiration of the interval and/or once the maximum queue depth is reached) only if the value associated with the key is the same. In this manner, a data object associated with the key may not be updated and/or modified with two different values. Various other compatibility rules may be used in connection with the present disclosure based at least in part on the data object, consensus protocol, or other information maintained by the data replication group 512.

In addition to batching operations together to improve performance, the data replication group 512 may include a limit on an amount of data that can be written and/or maintained by the data replication group 512. In scenarios of node 504 failure and/or during learning operations of the consensus protocol, the limit may prevent a large amount of data from being transmitted over a network, such as the network described above, in connection with FIG. 4. In yet other embodiments, the amount of data transmitted during learning operations is reduced by providing less than the total history of the replicated state machine and/or data object. In one example, only the current state of the replicated state machine is provided during learning operations. In addition, the remainder of the replicated state machine may be provided during idle times or during intervals of reduced network traffic.

As described above, the management system, in various embodiments, dynamically modifies the number of slots of the data replication group 512. In one example, network lag during transmission of proposals between the nodes 504 of the data replication group 512 causes the management system to reduce a maximum number of slots for the data replication group 512. In addition, the data replication group 512 may, in response to a request from the management system to add an additional slot, provide a negative response. In various embodiments, the data replication group service, or component thereof, obtains information from the data replication group 512 and places the information in a storage location accessible to the placement system and/or management system. The information may indicate lag, contention, network traffic, number of proposals, number of slots, number of free or occupied slots, amount of data maintained by the data replication group, or other information suitable for determining whether to modified a number of slots of the data replication group 512 and/or move an active slot to another data replication group 512.

Figure 6:
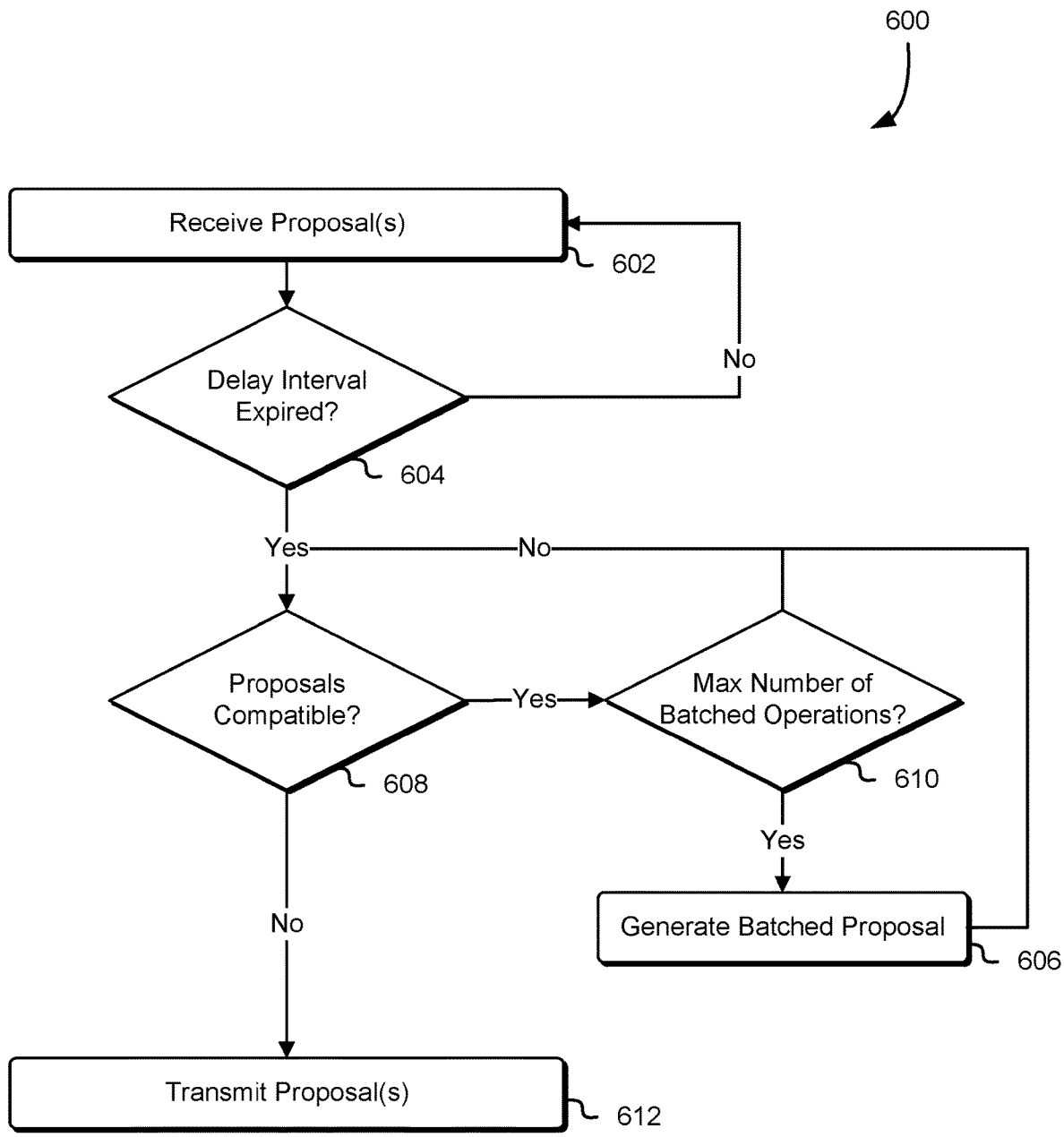
FIG. 6 shows an illustrative process which may be used to generate a batch update operation for a data replication group in accordance with at least one embodiment.

FIG. 6 is a block diagram illustrating an example of a process 600 for generating a set of batched proposals of a consensus protocol executed by a set of nodes of a data replication group in accordance with at least one embodiment. Some or all of the process 600 (or any other processes described, or variations and/or combinations of those processes) may be performed under the control of one or more computer systems, including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 600 may be performed by any suitable system, such as a server in a data center, by various components of the environment 100 described in conjunction with FIG. 1, such as the data replication group, by multiple computing devices in a distributed system of a computing resource service provider or by a service provided by a computing resource service provider. The process 600 includes a series of operations which result in grouping a plurality of operations and/or proposals of a set of nodes of a data replication group to advance a consensus protocol implemented by the set of nodes. For example, the process 600 includes receiving a proposal 602. As described above, updates to a value maintained by the data replication group may be transmitted to one or more nodes of the data replication group. Similarly, queries of the data maintained by the data replication group may be transmitted to one or more nodes of the data replication group. In various embodiments, the proposal may be received from another node of the data replication group or may be generated by the node in response to information received by the node (e.g., a query or update). In yet other embodiments, the received proposal is enqueued in a queue as described above.

In step 604, the system executing the process 600 may determine if a delay interval has expired. In various embodiments, once a proposal is received at a node, the node may initiate a delay interval, during which the node enqueues proposals in a queue until the expiration of the delay interval, at which point the node attempts to batch proposals stored in the queue as described in greater detail below. Returning to FIG. 6, if the delay interval has expired, the system executing the process 600 may proceed to step 608 and determine if proposals in the queue can be combined based at least in part on one or more compatibility rules, including proposals maintained in a queue and batched operations. If the delay interval has not expired the system executing the process 600 returns to step 602 and may continue to receive proposals.

In step 608, the system executing the process 600 determines if two or more proposals do not violate the compatibility rules. In various embodiments, if two or more proposals can be combined without violating the compatibility rules as described above, the system executing the process 600 then generates a batch proposal based at least in part on the two or more proposals. In an embodiment, the batched proposal includes each proposal in its entirety. In yet other embodiments, the batched proposal includes a portion of the two or more proposals to be grouped together. For example, if two or more proposals contain an identical portion, the batch operation may include only one copy of the identical portion of the two proposals. Other mechanisms for reducing or otherwise combining proposals of a batched proposal are within the scope of the present disclosure.

In step 610, the system executing the process 600 may determine if a maximum number of batched operations has been reached. In various embodiments, a maximum number of operations can be batched or otherwise combined together. This may prevent contention, reduce network traffic, or otherwise reduce an amount of computing resource utilized by the data replication groups. If a maximum number of batched operations have been reached, the system executing the process 600 continues to step 606 and generates a batched proposal including the proposals that do not violate the compatibility rules.

In step 610, if the maximum number of batch operations has not been reached, the system executing the process 600 may return to step 608 and determine if one or more additional proposals remaining in the queue are compatible with the proposals included in the batched proposal. As described above, the data replication group may include logic, source code, or other executable code that, when executed by one or more nodes of the data replication group, cause the data replication group to determine the compatibility of two or more proposals to be grouped together based at least in part on one or more compatibility rules. The compatibility rules may be determined based at least in part on a consensus protocol implemented by the data replication group. If the proposals are not compatible (e.g., at least one compatibility rule is violated), the system executing the process 600 may maintain the proposal in the queue and transmit any proposals, including proposals maintained in a queue and batched operations in step 612.

In step 612, the system executing the process 600 may transmit any proposals including batch proposals to one or more other nodes of the data replication group. As illustrated by the process 600, nodes of a particular data replication group, once a request is received, place the request in a queue and initiate a delay interval. The delay interval may allow a number of proposals to be received and/or placed in a queue to be batched based at least in part on the process 600. In one example, during a particular delay interval a particular node receives 40 proposals. The particular node, at the expiration of the delay interval may attempt to batch some or all of the 40 proposals. In this example, the particular node obtains proposals from the queue and determines if the proposals can be combined based at least in part on compatibility rules as described above. Furthermore, in various embodiments, a limit may be placed on the number of proposals that may be batched together. Returning to the example above, if the max number of proposals that can be batched is 20, then the particular node may generate two batches of 20 proposals during processing of the 40 proposals in the queue (assuming there are no violations of the compatibility rules). Note that one or more of the operations performed in 602-612 may be performed in various orders and combinations, including in parallel. In numerous variations to the process 600, one or more of the operations 602-612 may be omitted or performed by other systems of services.

Figure 7:
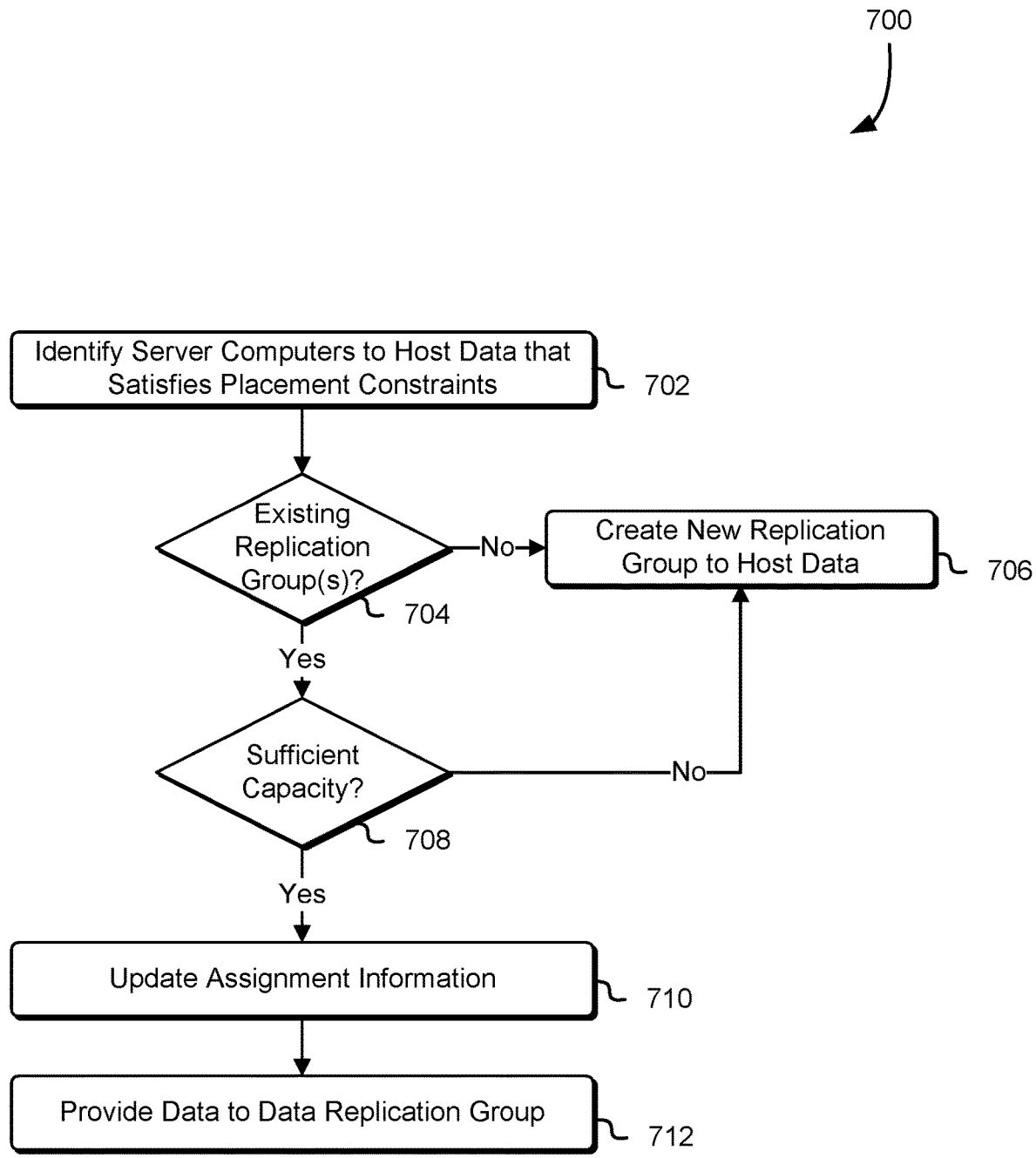
FIG. 7 shows an illustrative process which may be used to assign data to be maintained by a data replication group in accordance with at least one embodiment.

FIG. 7 is a block diagram illustrating an example of a process 700 for assigning a data object to a slot of a data replication group in accordance with at least one embodiment. Some or all of the process 700 (or any other processes described, or variations and/or combinations of those processes) may be performed under the control of one or more computer systems, including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 700 may be performed by any suitable system, such as a server in a data center, by various components of the environment 100 described in conjunction with FIG. 1, such as a placement system, by multiple computing devices in a distributed system of a computing resource service provider or by a service provided by a computing resource service provider. The process 700 includes a series of operations which result in the placement service providing a set of data replication groups that can host the data object to a management system for selection. For example, the process 700 includes identifying server computers that satisfy one or more placement constraints to host data 702. As described above, the placement system may then execute the selection algorithm. Executing the selection algorithm may include executing a search (e.g., deep-first search) of a graph generated based at least in part on the racks and deployment groups described above. The selection algorithm may return a number of nodes satisfying the one or more constraints based at least in part on a maximum flow of the graph. If a solution is determined, the placement system may provide placement information. The placement information may include a set of nodes of a set of data replication groups determined based at least in part on the solution. Various selection algorithms and placement constraints are described in detail in U.S. patent application Ser. No. 15/264,479 hereby incorporated by reference to the same extent as if the reference was set forth in its entirety herein.

In step 704, the system executing the process 700 determines if the placement information includes one or more existing data replication groups (e.g., data replication groups previously instantiated and currently healthy). In one example, the system executing the process 700 determines if a portion of the set of nodes included in the placement information is implementing a data replication group. If there are no existing data replication groups, the system executing the process 700 may continue to step 706 and create a new data replication group to host the data based at least in part on the placement information. Various methods for instantiating data replication groups from a set of nodes and/or host computer systems capable of executing nodes are described in detail in U.S. patent application Ser. No. 14/954,928 hereby incorporated by reference to the same extent as if the reference was set forth in its entirety herein.

Returning to FIG. 7, if the system executing process 700 determines there is at least one existing data replication group, the process 700 may continue to step 708 and the system executing the process 700 may determine if there is sufficient capacity (e.g., at least one free slot) to store the data. If there is insufficient capacity (e.g., none of the data replication groups have a free slot), the system executing the process 700 may continue to step 706 described in greater detail above. However, if at least one data replication group contains a free slot, the system executing the process 700 may continue to step 710 and update assignment information associated with at least one data replication group. In various embodiments, if a plurality of data replication groups have sufficient capacity the system executing the process 700 may select a data replication group based at least in part on various mechanisms such as a selection algorithm, round robin, soft constraints, location relative to other computing resources, or other mechanisms suitable for selecting a data replication group from a plurality of data replication groups.

In step 710, the system executing the process 700 updates the assignment information. As described above, the data replication group service may maintain replication group data indicating data objects, customers, and/or computing resources assigned or otherwise associated with particular data replication groups. In various embodiments, a mapping of data objects to data replication groups is used to distribute requests and/or operations to the appropriate data replication group. In step 712, the system executing the process 700 may provide the data object to the data replication group. In various embodiments, the data replication group service transmits the data object over a network to one or more nodes of the data replication group. Note that one or more of the operations performed in 702-712 may be performed in various orders and combinations, including in parallel. In numerous variations to the process 700, one or more of the operations 702-712 may be omitted or performed by other systems of services.

Figure 8:
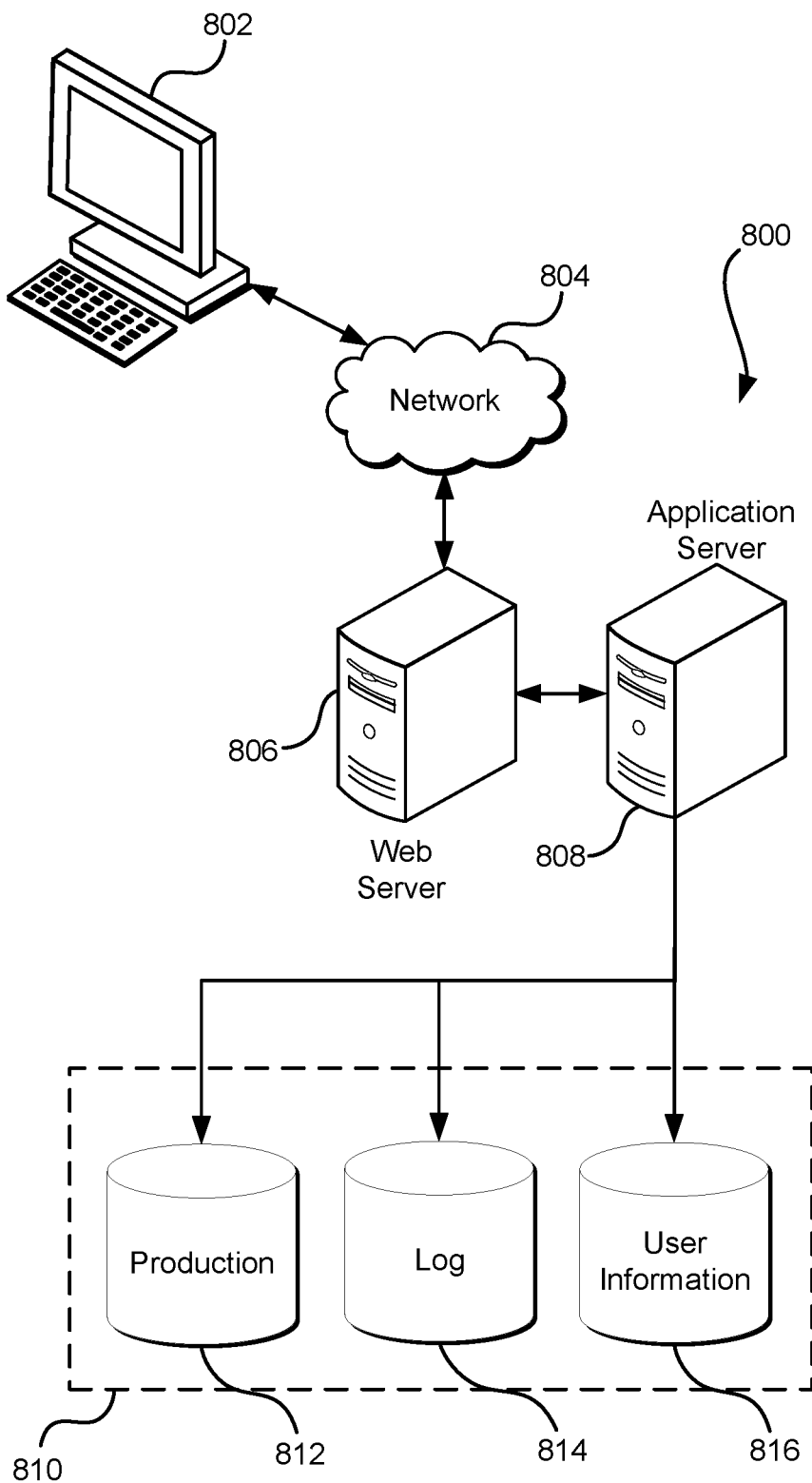
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes, and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform it's intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these, and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM"), or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving a request to manage metadata for a logical volume; and
fulfilling the request by at least:
selecting a plurality of nodes that satisfy a placement constraint associated with the logical volume, the placement constraint satisfied by nodes that share a network device with the logical volume;
determining a set of data replication groups represented by the plurality of nodes;
determining that a data replication group from the set of data replication groups contains a free slot to manage the metadata of the logical volume; and
assigning the logical volume to the free slot, thereby causing the free slot to become an occupied slot, the data replication group maintaining additional metadata associated with another logical volume in a second slot.

2. The computer-implemented method of claim 1, wherein assigning the logical volume to the free slot further comprises causing nodes of the data replication group to use a first instance of a consensus protocol to replicate the metadata of the logical volume and to use a second instance of the consensus protocol to replicate the additional metadata associated with the other logical volume.

3. The computer-implemented method of claim 1, wherein the computer-implemented method further comprises:
determining that at least a portion of the logical volume has been moved to a different device in a network; and
assigning the logical volume to a new slot of a new data replication group.

4. The computer-implemented method of claim 1, wherein the computer-implemented method further comprises:
detecting contention between two or more nodes of the data replication group based at least in part on network latency between the two or more nodes; and
assigning the logical volume to a new slot of a new data replication group.

5. A system, comprising:
one or more processors; and
memory that stores computer-executable instructions that, if executed, cause the system to:
receive a request to track metadata for a first volume;
receive a placement constraint constraining a first location of a first computer system, of a plurality of computer systems, hosting a first node based on (1) a second location of a second computer system, of the plurality of computer systems, hosting a second node and (2) a location of a network device capable of routing traffic between the first and second computer systems; and
to fulfill the request, determine a data replication group with a set of slots, the data replication group a member of a set of data replication groups, by at least:
identifying a set of computer systems of the plurality of computer systems to host a plurality of nodes of the data replication group, the set of computer systems satisfying the placement constraint;
determining that the data replication group contains a free slot of the set of slots to track the metadata of the first volume; and
causing the plurality of nodes to run a consensus protocol to track the metadata of the first volume by at least assigning the metadata to the free slot of the set of slots causing the free slot to become an occupied slot.

6. The system of claim 5, wherein the memory further includes computer-executable instructions that, if executed, cause the system to cause the set of slots to be modified based at least in part on consumption of computing resources by nodes of the data replication group.

7. The system of claim 5, wherein the memory further includes computer-executable instructions that, if executed, cause the system to, as a result of causing the plurality of nodes to run the consensus protocol, receive a response from the data replication group indicating that a subset of available slots of the set of slots is empty and determining a second plurality of nodes of a second data replication group of the set of data replication groups to store the metadata.

8. The system of claim 5, wherein the memory further includes computer-executable instructions that, if executed, cause the system to cause the data replication group to combine a first proposal of the consensus protocol with a second proposal of the consensus protocol, where the first proposal and the second proposal are messages associated with distinct slots of the set of slots.

9. The system of claim 8, wherein the computer-executable instructions that cause the system to combine the first proposal and the second proposal further includes computer-executable instructions that, if executed, cause the system to combine the first proposal and the second proposal as a result of the combination of the first proposal and the second proposal satisfying a compatibility rule indicating proposals that can be combined.

10. The system of claim 8, wherein the memory further includes computer-executable instructions that, if executed, cause the system to cause the data replication group to delay processing a plurality of proposals by at least enqueuing, in a queue, the plurality of proposals, the plurality of proposals including the first proposal and the second proposal.

11. The system of claim 10, wherein the computer-executable instructions that cause the system to cause the data replication group to combine the first proposal and the second proposal further included computer-executable instructions that, if executed, cause the system to cause the data replication group to combine the first proposal and the second proposal as a result of a number of proposals in the queue being within a threshold relative to a maximum number of batched proposals.

12. The system of claim 8, wherein computer-executable instructions that cause the system to cause the data replication group to combine the first proposal and the second proposal further included computer-executable instructions that, if executed, cause the system to cause the data replication group to combine the first proposal and the second proposal as a result of an expiration of an interval of time.

13. A set of non-transitory computer-readable storage media having stored thereon executable instructions that, if executed by one or more processors of a computer system, cause the computer system to:
- receive an indication that a logical volume has been created; and
- manage storage of metadata associated with the logical volume by at least:
  - determining a set of computer systems satisfying a placement constraint, the set of computer systems hosting a plurality of nodes of a data replication group, where the plurality of nodes are implementing a consensus protocol and the data replication group contains a set of slots available for storing the metadata associated with the logical volume;
  - determining a free slot of the set of slots that satisfies the placement constraint;
  - causing the plurality of nodes to run the consensus protocol to reach consensus that the free slot is usable for associating with the metadata; and
  - causing the metadata associated with the logical volume to be associated with the free slot, causing the free slot to become an occupied slot.

14. The set of non-transitory computer-readable storage medium of claim 13, wherein the instructions further comprise instructions that, as a result of being executed by the one or more processors, cause the computer system to rebalance a plurality of slots of a plurality of data replication groups based at least in part on a set of computing resources consumed by the plurality of data replication groups of which the data replication group is a member.

15. The set of non-transitory computer-readable storage medium of claim 13, wherein the instructions further comprise instructions that, as a result of being executed by the one or more processors, cause the computer system to:
- determine a network latency associated with a proposal of the consensus protocol associated with the data replication group; and
- cause a maximum number of slots supported by the data replication group to be modified to affect the network latency.

16. The set of non-transitory computer-readable storage medium of claim 13, wherein a first slot of the set of slots manages storage of data associated with a customer of a computing resource service provider.

17. The set of non-transitory computer-readable storage medium of claim 13, wherein the metadata further includes a first network location of a set of master partitions associated with the logical volume and a second network location of a set of slave partitions associated with the logical volume.

18. The set of non-transitory computer-readable storage medium of claim 13, wherein the instructions further comprise instructions that, as a result of being executed by the one or more processors, cause the computer system to combine a plurality of heartbeat messages associated with the set of slots into a batched heartbeat message.

19. The set of non-transitory computer-readable storage medium of claim 13, wherein the instructions further comprise instructions that, as a result of being executed by the one or more processors, cause the computer system to assign a key to the metadata, the key unique to the metadata relative to the set of slots of the data replication group.

20. The set of non-transitory computer-readable storage medium of claim 13, wherein the instructions further comprise instructions that, as a result of being executed by the one or more processors, cause the computer system to select the data replication group from a set of data replication groups associated with the plurality of nodes based at least in part on a soft constraint of a set of placement constraints.

* * * * *